United States Patent
Caldwell

(10) Patent No.: US 6,236,095 B1
(45) Date of Patent: May 22, 2001

(54) CARRIER STRUCTURE FOR SEMICONDUCTOR TRANSDUCERS

(75) Inventor: John W. Caldwell, Orange, CT (US)

(73) Assignee: Dresser Equipment Goup, Inc., Carrollton, TX (US)

( * ) Notice: Subject to any disclaimer, the term of this patent is extended or adjusted under 35 U.S.C. 154(b) by 0 days.

(21) Appl. No.: 09/504,669

(22) Filed: Feb. 15, 2000

(51) Int. Cl.$^7$ ........................................... H01L 29/82
(52) U.S. Cl. ............................. 257/419; 257/417; 257/418
(58) Field of Search ........................ 257/415, 417, 257/418, 419

(56) References Cited

U.S. PATENT DOCUMENTS

| | | | |
|---|---|---|---|
| 3,329,023 | 7/1967 | Kurtz et al. | 73/398 |
| 3,654,579 | 4/1972 | Kurtz et al. | 338/2 |
| 3,772,628 | 11/1973 | Underwood et al. | 338/4 |
| 4,333,349 | 6/1982 | Mallon et al. | 73/708 |
| 4,467,656 | 8/1984 | Mallon et al. | 73/727 |
| 4,476,726 | 10/1984 | Kurtz et al. | 73/708 |
| 4,481,497 | 11/1984 | Kurtz et al. | 338/2 |
| 4,510,671 | 4/1985 | Kurtz et al. | 29/571 |
| 4,530,244 | 7/1985 | Starr | 73/727 |
| 4,672,354 | * 6/1987 | Kurtz et al. | 338/4 |
| 4,739,298 | 4/1988 | Kurtz et al. | 338/2 |
| 4,814,845 | 3/1989 | Kurtz et al. | 357/26 |
| 4,814,856 | 3/1989 | Kurtz et al. | 357/73 |
| 4,843,454 | 6/1989 | Kato et al. | 357/79 |
| 5,002,901 | 3/1991 | Kurtz et al. | 437/228 |
| 5,126,813 | 6/1992 | Takahashi et al. | 357/26 |
| 5,156,052 | 10/1992 | Johnson et al. | 73/727 |
| 5,170,237 | 12/1992 | Tsuda et al. | 257/419 |
| 5,177,579 | 1/1993 | Jerman | 73/724 |
| 5,186,055 | 2/1993 | Kovacich et al. | 73/727 |
| 5,459,351 | 10/1995 | Bender | 257/417 |
| 5,604,363 | 2/1997 | Ichihashi | 257/274 |
| 5,629,538 | 5/1997 | Lipphardt et al. | 257/254 |
| 5,821,595 | 10/1998 | Trimmer et al. | 257/417 |
| 5,852,320 | * 12/1998 | Ichihashi | 257/419 |

* cited by examiner

*Primary Examiner*—Ngân V. Ngô
(74) *Attorney, Agent, or Firm*—Hayes and Boone, LLP

(57) ABSTRACT

A carrier structure for semiconductor transducers is disclosed. The carrier structure mounts as a single unit to a force-impacted base substrate and includes multiple piezoresistive elements integrally formed with the carrier structure, such that the elements are located on a predetermined elevation level as the carrier structure while maintaining their electrical contacts and their precise positions by using metal traces on a silicon substrate among the piezoresistive elements and bonding wires between the structure the elements.

13 Claims, 2 Drawing Sheets

CARRIER STRUCTURE FOR SEMICONDUCTOR TRANSDUCERS

BACKGROUND OF THE INVENTION

The invention relates generally to semiconductor transducers and, more particularly, to such transducer assemblies that employ a single block semiconductor carrier structure for supporting semiconductor piezoresistive elements (e.g., strain gages).

Semiconductive transducers are widely used in automotive, biomedical and a variety of other applications because of their relatively small dimensions, reliability and high signal output relative to other devices. In performing the transducer function, one or more piezoresistive semiconductor elements are utilized, in which the resistance thereof varies according to the intensity or magnitude of an applied force upon an associated diaphragm to which the elements are mechanically coupled (bonded). The diaphragm to which the force is applied is typically a metal or semiconductor membrane-like substrate upon which the piezoresistive elements are dielectrically mounted. A force applied to the diaphragm deflects the diaphragm and hence causes the associated piezoresistive element to vary resistance in accordance with the deflection. The force being measured is transferred to the piezoresistive element, which is strain responsive, causing the element to expand or compress, thereby producing a change in the electrical resistance of the element. The piezoresistive elements are typically arranged in a Wheatstone bridge circuit with one to four of the bridge legs being active. Other circuit configurations are also possible.

A desire is to continue improving the characteristics of transducers of the foregoing type so that devices may be manufactured that are relatively small, sensitive and which produce a relatively large resistance in a relatively small area. The devices should also exhibit a linear operation and small deviations in sensitivity and null offset over a wide range of temperatures, as well as having a relatively low manufacturing cost.

A problem in achieving these improved characteristics and cost efficiencies, however, relates to the manner in which prior art transducers are manufactured and assembled. Prior art transducer assemblies require multiple piezoelectric elements, i.e., "gages," to be manufactured as discrete elements. Manufacturing process and material variations contribute to a lack of uniformity of these elements. The gages must subsequently be electrically normalized based upon their mechanical deviation and their deviation from optimum bonding position on the diaphragm, and it is therefore difficult to achieve consistent results from one transducer assembly to the next.

SUMMARY OF THE INVENTION

The present invention, accordingly, describes a cost effective transducer assembly having a semiconductor carrier structure that integrally supports multiple piezoelectric elements for mounting as a single unit to a diaphragm or other force-impacted substrate.

The integrally formed piezoelectric elements, i.e., gages, are separated from the carrier structure in a space defined by the structure while maintaining their electrical contact and their precise position relative to the structure by using electrically conductive, metallic bonding wires and thin film metalized traces attached to both the structure and the elements. The carrier structure maintains the precise, relative position of the elements throughout the manufacturing process. The transducer assembly is thus well suited for precise registration and mounting to a substrate by an automated process.

In one embodiment, a carrier structure for semiconductor transducers mounts as a single unit to a force-impacted substrate and includes multiple piezoelectric elements integrally formed with the carrier structure, such that the elements are located on the same elevation level as the carrier structure while maintaining their electrical contacts and their precise positions relative to the structure by using electrically conductive wires attached to both the structure and the elements.

In another embodiment, a carrier structure for semiconductor transducers mounts as a single unit to a force-impacted substrate and includes multiple piezoelectric elements integrally formed with the carrier structure, such that the elements are located on the same elevation level as the carrier structure, and the elements are connected into a bridge circuit form by metalized traces, and connected to the carrier structure through bonding wires. Therefore, in the assembly process, it is not necessary to handle and mount individual elements separately, since they are already in the bridge circuit form. Accordingly, automated handling and assembly machines can be used for better quality control and reduced manufacturing cost.

DETAILED DESCRIPTION OF THE PREFERRED EMBODIMENT

Figure 1:
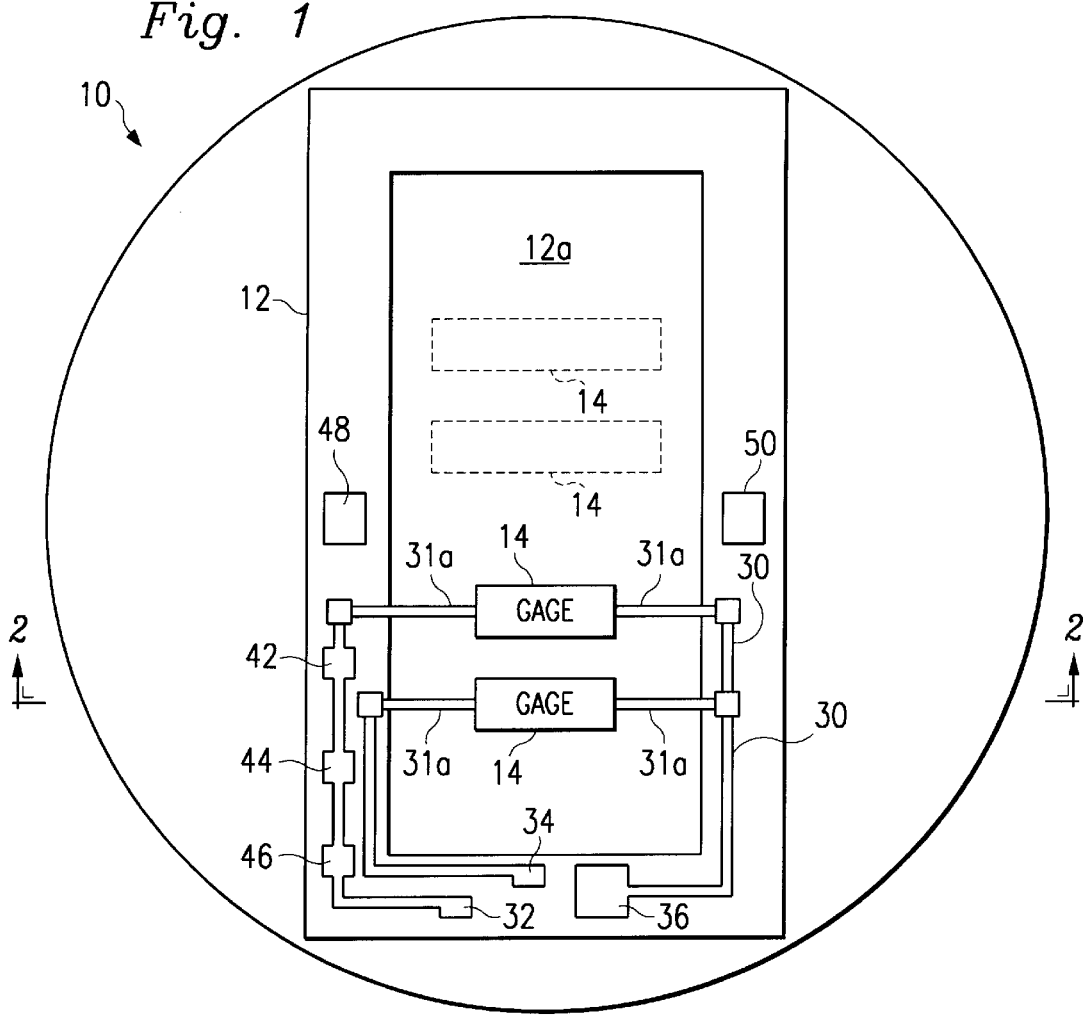
FIG. 1 is a top plan view of an embodiment of a transducer assembly employing a carrier structure.
Figure 2:
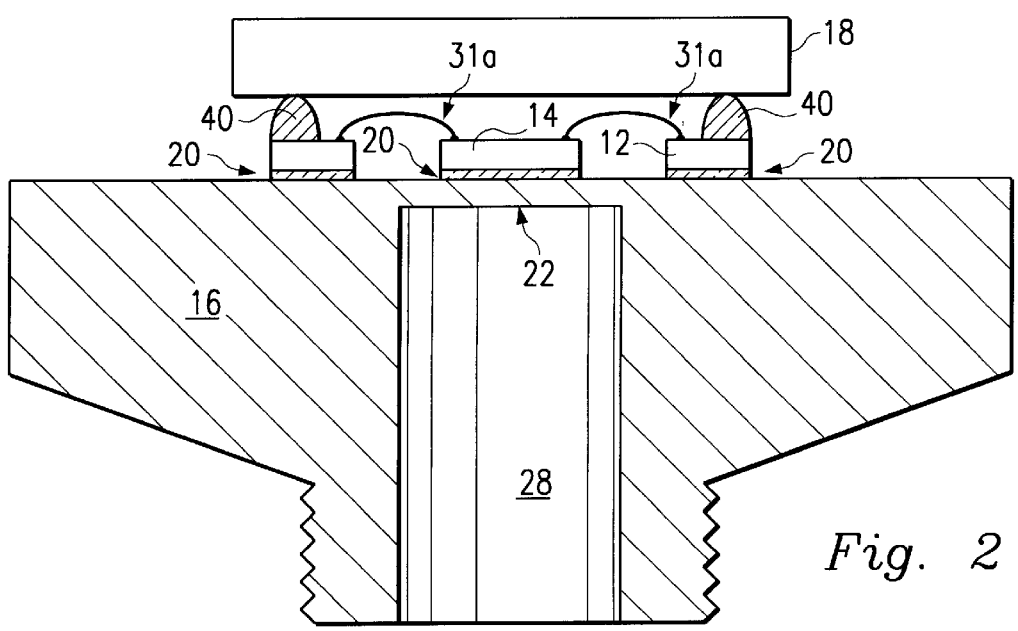
FIG. 2 is a partial cross-section view of an embodiment of the assembly taken through line 2—2 of FIG. 1.

An improved transducer assembly is described in FIG. 1 and FIG. 2 wherein all components are situated at the same elevation level.

As shown in FIGS. 1 and 2, the transducer assembly 10 includes a semiconductor carrier structure 12 having integrally-formed piezoelectric elements 14, (e.g., strain gages), a diaphragm 16 serving as a substrate for the carrier structure, and an electronics board 18. Carrier 12 and the piezoresistive elements 14 are preferably bonded to diaphragm housing 16 by glass bond 20. Diaphragm housing 16 includes an active region 22 and a fluid chamber 28.

While not shown, it is understood that a fluid, such as air, oil, water or the like, entering or leaving the bottom portion of the chamber 28, as shown in FIG. 2, imparts a force to be measured to an active region of the diaphragm 16. This causes the diaphragm 16 to be deflected, causing the piezoresistive elements 14 mounted on the diaphragm 16 to expand or compress, thereby producing a change in the resistance of the piezoresistive elements 14 which is then measured by conventional circuitry (not shown), some or all of which may be located on either or both of the carrier structure 12 or the electronics board 18.

The carrier structure 12 is comprised of a semiconductor material, such as a monolithic or built up laminate consisting of silicon and dielectric material such as oxides, nitrides, polymers and the like, intercalated to create a block of bulk material. The block may be fabricated using a single crystal of silicon, gallium, germanium or other semiconductor, for example.

The carrier structure 12 and the piezoresistive elements 14 are formed using standard photolithographic and other etching techniques. The etching is performed on a block of material forming the carrier structure 12 to define the piezoresistive elements 14 such that the piezoresistive elements are carved out and separated from the carrier structure 12, but have interconnecting electrical paths connecting the piezoresistive elements 14 to the carrier structure 12. Techniques utilized include, for example, wet etching of the block where isotropic or anisotropic etchants such as KOH or TMAH are used, and dry etching where reactive ion etching is used. The carrier structure 12 is fabricated as shown in FIG. 1 to define an opening, preferably a window 12a, in which at least one piezoresistive element 14 resides.

Conducting lands 30 are deposited and patterned on the carrier 12 (using shadow masking techniques, for example) for providing electrically conductive paths for the piezoresistive elements 14. The lands 30 may be constructed of aluminum or any other conductive metal and further may be insulated by depositing insulating material thereon.

Electrical bonding between the carrier structure 12 and the piezoresistive elements 14 can be made by bonding wires 31a, as shown in FIG. 2, which also physically support the piezoresistive elements 14 within the window 12a. Once the manufacturing process is completed and the piezoresistive elements 14 are bonded (as described below) to the diaphragm 16, the bonding wires 30a are the only connections between the piezoresistive elements 14 and the carrier structure 12. Since the piezoresistive elements 14 are mechanically decoupled from the rest of the carrier structure 12, except maintaining the electrical connections to the carrier structure 12, the piezoresistive elements 14 are able to more accurately and sensitively measure localized forces exerted on the diaphragm 16 at the individual locations of the piezoresistive elements 14. Moreover, the bonding wires 30a can be made of certain special metals having some predetermined characteristics so that, although the wires 30a are conductively connected to the isolated piezoresistive elements 14, they still will not affect the accuracy and sensitivity of the piezoresistive elements 14.

In the normal practice of semiconductor manufacturing, wire bonds are regularly made between a plurality of bond pads on a chip to pads in a package housing assembly after each chip is sawed off from a wafer. It is a feature of this invention to selectively bond the carrier structure 12 and the piezoresistive elements 14 on the same chip. Thus, the piezoresistive elements 14 and the carrier structure 12 can be made on the same substrate, i.e, a wafer, and processed together, thereby reducing the cost. Further, a simple wire bonding process can be done between the piezoresistive elements 14 and the carrier structure 12 on the wafer before it is further divided into multiple transducers.

Output pads 32, 34, 36 are provided at the terminus (or other location) of the lands 30 for electrically connecting the carrier structure 12 to external electronics. The pads 32–36 may employ solder bump technology to alter the height of the pads in order to provide space and relief between the carrier structure 12 and external electronics such as the electronics board 18. As shown in FIG. 2, an electrically conductive solder or bonding 40 connects the lands 30 to the electronics (not shown) of the electronics board 18. While not shown, it is understood that the electronics of the electronics board 18 may include any type of electronic elements for use with the assembly 10, including normalizing resistors and interconnecting circuits, peripheral feature circuits and the like.

A series-resistance chain made up of resistors 42, 44, 46 (FIG. 1) is also included as part of the electrically conductive lands 30. In forming the resistors 42–46, it is understood that resistive trimming utilizing a laser or other tool may be performed to change the resistance values thereof. Similar techniques may be utilized on the lands 30, as well. Those similar techniques may additionally be used on the piezoresistive elements 14 to change the dimensions, or modify the resistance, of the piezoresistive elements.

Other circuits 48 and 50 are included in the carrier structure 12 for integrating additional active signal conditioning and electronics processing with the carrier structure 12. The other circuits 48 and 50 may be made integral to the carrier structure 12 by etching, masking and other processes, or, alternatively, may be deposited on the carrier structure 12.

Once the carrier structure 12 is in place, the electronics board 18 is bonded to the carrier structure 12 by aligning the conductive contact points of the board 18 with those of the carrier structure 12. In this manner the remainder of the electronics contained in the board 18 and associated with the assembly 10 are quickly and accurately connected to the carrier structure 12. It is thus apparent that both the mounting of the carrier structure 12 to the diaphragm 16 and the mounting of the electronics block 18 to the carrier structure 12 are readily capable of being performed by automated equipment, thereby reducing labor costs and improving the quality of the end product, i.e., the assembly 10.

Figure 3:
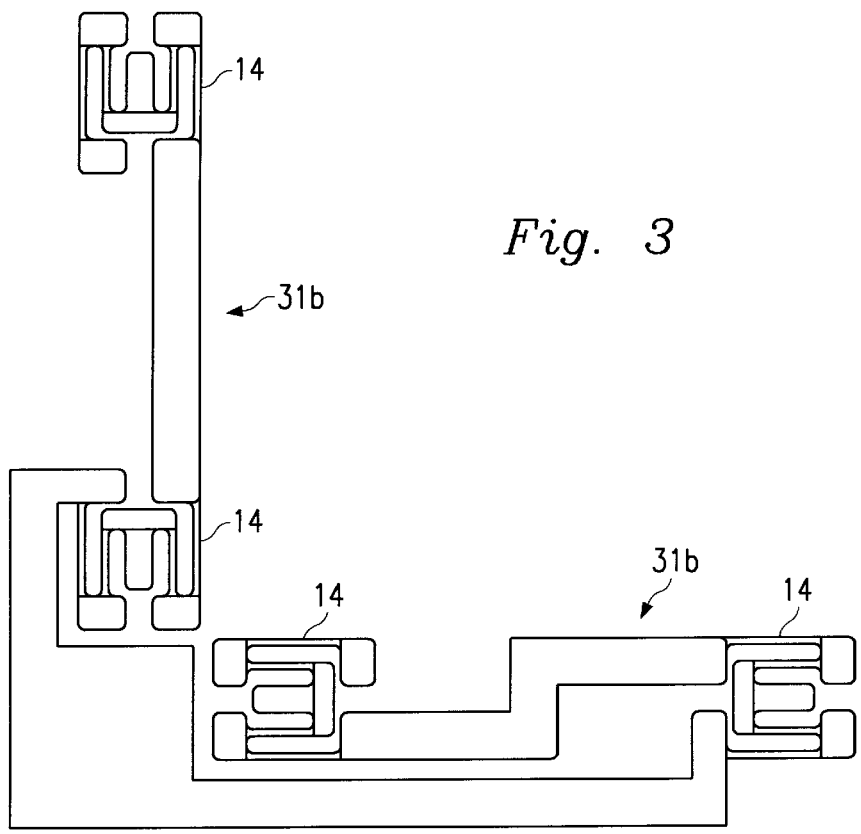
FIG. 3 is a top plan view of four gages connected by metal traces on a silicon wafer according to the present invention.

FIG. 3, a layout of four piezoresistive elements 14 with metal traces connected among them, illustrates another embodiment of the present invention. Instead of completely decoupling the piezoresistive elements 14 from the carrier structure 12 on the same silicon substrate, the piezoresistive elements 14 are connected by depositing metal traces 30b between them to make them into a bridge circuit form. The metal traces 30b can be metalized aluminum or other similar metals. This configuration gives at least two advantages.

The first advantage is that the metal traces 30b and the silicon substrate (not shown) provide a strong foundation for all the piezoresistive elements 14. Therefore, the entire unit is more easily handled during assembly and other applications because of the strength of the metal traces. Further, since the piezoresistive elements are connected in a recognizable bridge circuit form, various vision equipment can be used to identify the piezoresistive elements 14 swiftly, thereby allowing the assembly process to be automated.

A second advantage is that the number of bonding wires 31a is reduced by the on-silicon connections made by the deposited metal traces 31b. At least three wires 31a can be saved by connecting four piezoresistive elements 14 in this configuration. This configuration also maintains the close wafer identity of all the piezoresistive elements 14 until at least the assembly stage, whereas, in some situations, one or two piezoresistive elements 14 may be broken apart when mounting on larger diaphragms. By maintaining the close wafer identity, the piezoresistive elements 14 will have uniform silicon characteristics and, thus, electrical characteristics.

Figure 4:
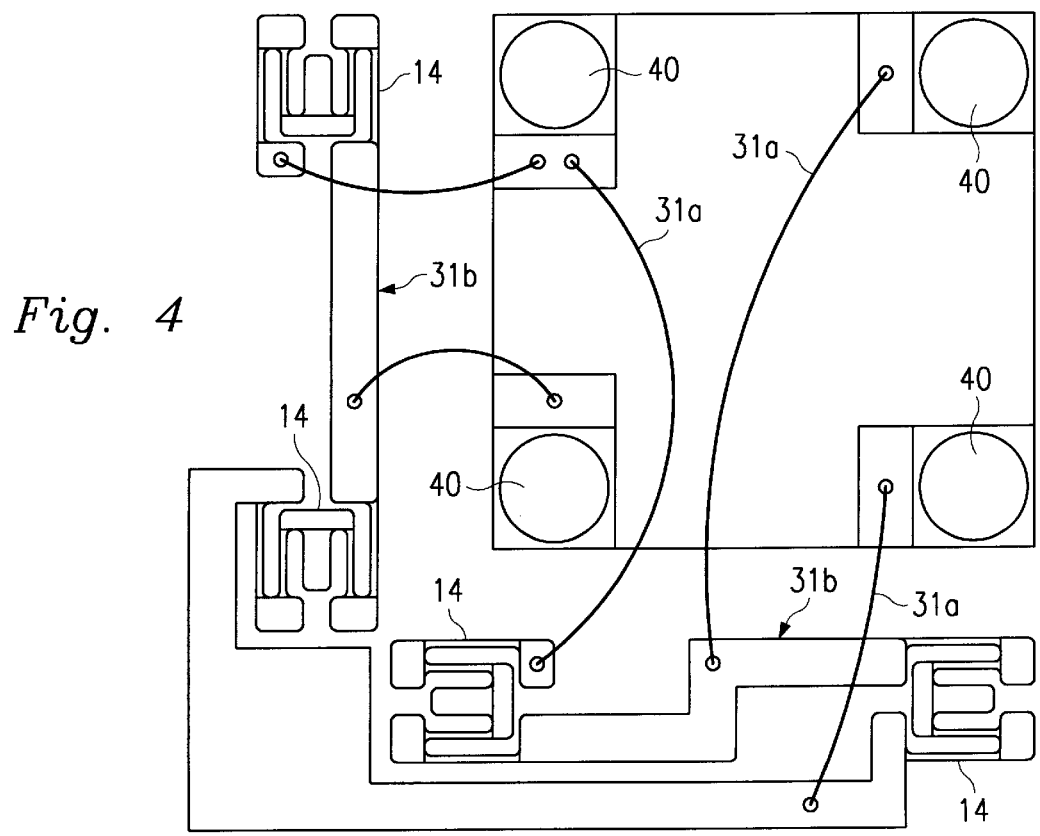
FIG. 4 is a top plan view of another embodiment of a transducer wherein the gages are connected and supported by metal traces on the same silicon substrate and whereas the connections between the carrier structure and conductive solder or bonding outputs are made by bonding wires.

FIG. 4 illustrates a layout of the transducer design with four piezoresistive elements 14 connected to each other by metal traces 31b and further connected to solder bumps 40 by bonding wires 31a. First, the layout of the piezoresistive elements 14 and the metal pads for the solder bumps 40 for connecting to other circuits can be efficiently planned since they are all now on the same wafer. In an optimal design, the size of the entire bridge circuit is relatively compact. For example, as it is shown in FIG. 4, four piezoresistive elements are arranged in a "L" shape in order to save space on the silicon substrate (not shown).

In addition, as mentioned above, the metal traces 31b on the same silicon substrate give all the piezoresistive elements 14 a solid foundation. Further, since the bridge circuit form can easily be recognized by automated assembly machines, the wire bonding process can be simplified.

Hence, several efficiencies and improvements over other transducer arrangements are achieved with various embodiments of the present invention. First, the designs and locations of the carrier structure 12 and the piezoelectric elements 14 relative to the diaphragm 16 are determined in the design stage. The advantage of being able to arrange the piezoresistive elements 14 at the design stage in a bridge circuit form is that the piezoresistive elements 14 can be assured to have comparatively uniform characteristics even if any one of them may be severed from the group later in the assembly process.

Additionally, even though the piezoresistive elements 14 are on the same wafer as the carrier structure 12, the piezoelectric elements 14 are not adversely affected by heat or electrical interference from the additional circuitry, since only the thin bonding wires 31a are the connections to the rest of the circuitry.

Further, using the metal traces to connect and arrange the piezoelectric elements 14 in a bridge circuit form not only increases the mechanical support to each piezoelectric element, but also reduces the number of bonding wires needed, which in turn, further reduces the cost of mass manufacturing the transducers.

As thus described, the invention enables improved quality control and reduced manufacturing costs for transducer assemblies. Improved accuracy is also ensured during the assembly and placement of the piezoresistive elements 14 on the diaphragm substrate 16.

The above disclosure provides many different embodiments, or examples, for implementing different features of the invention. Techniques and requirements that are only specific to certain embodiments should not be imported into other embodiments. Also, specific examples of signals, components, and processes are described above to help clarify the invention. These are, of course, merely examples and are not intended to limit the invention from that described in the claims.

Although illustrative embodiments of the present invention have been shown and described, a latitude of modification, change and substitution is intended in the foregoing disclosure, and in certain instances, some features of the invention will be employed without a corresponding use of other features. For example, electrical device or circuit elements other than piezoresistive elements may be employed and the application may involve electrical circuit or electromechanical assemblies other than transducer assemblies. Accordingly, it is appropriate that the appended claims be construed broadly and in a manner consistent with the scope of the invention.

What is claimed is:

1. A transducer assembly comprising:
   a semiconductor carrier structure for mounting as a single unit to a substrate; and
   at least one sensor circuit element integrally formed with the carrier structure, such that the sensor circuit element is located at the same elevation level as the carrier structure in a free space defined by the structure while maintaining the electrical contact and the precise position of the sensor circuit element relative to the structure.

2. The transducer assembly of claim 1 further comprising at least one other circuit forming part of the structure, the other circuit being electrically connected to the at least one sensor circuit element.

3. The transducer assembly of claim 1 wherein the electrical contact is maintained by using metal bonding wires.

4. The transducer assembly of claim 1 wherein the sensor circuit element is a piezoresistive element.

5. The transducer assembly of claim 1 wherein the sensor circuit element forms a part of a bridge circuit.

6. The transducer assembly of claim 1 wherein the substrate is a diaphragm so that a force applied to the diaphram causes the sensor circuit element to react electrically.

7. A transducer assembly comprising:
   a semiconductor carrier structure for mounting as a single unit to a force-impacted base substrate;
   multiple piezoresistive elements integrally formed with the carrier structure on a silicon substrate, such that the piezoresistive elements located thereon are at a predetermined elevation level, connected to each other in a bridge circuit form, and supported by a plurality of metal traces on the silicon substrate so as to maintain their electrical contacts and their precise positions relative to the carrier structure; and
   a plurality of soldering outputs on the silicon substrate for providing electrical connections from the piezoresistive elements to other circuitries of said transducer assembly, wherein the piezoresistive elements are connected to the soldering outputs by a plurality of metal bonding wires.

8. The transducer assembly of claim 7 wherein the soldering outputs are metal solder bumps.

9. The transducer of claim 7 wherein the metal bonding wires have a special character that does not affect the electrical functionality of the piezoresistive elements.

10. The transducer of claim 7 wherein the piezoresistive elements, the carrier structure, and the metal traces are arranged in predetermined locations for obtaining a compact device size while not sacrificing the performance of the transducer.

11. The transducer of claim 7 wherein at least one piezoresistive element can be severed from the bridge circuit form.

12. The transducer of claim 7 wherein all the piezoresistive elements are arranged in a close vicinity on the silicon substrate to obtain material uniformity for forming the piezoresistive elements.

13. The transducer of claim 7 wherein all the piezoresistive elements are arranged in an "L" shape recognizable by automatic processing machines in the manufacturing process.

* * * * *